United States Patent
Inoue et al.

(10) Patent No.: US 9,969,886 B2
(45) Date of Patent: May 15, 2018

(54) LATEX FOR FRICTION MEMBER USE AND FRICTION MEMBER

(71) Applicant: ZEON CORPORATION, Tokyo (JP)

(72) Inventors: Sayaka Inoue, Tokyo (JP); Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days. days.

(21) Appl. No.: 15/539,532

(22) PCT Filed: Dec. 18, 2015

(86) PCT No.: PCT/JP2015/085465
§ 371 (c)(1),
(2) Date: Jun. 23, 2017

(87) PCT Pub. No.: WO2016/104350
PCT Pub. Date: Jun. 30, 2016

(65) Prior Publication Data
US 2017/0355854 A1    Dec. 14, 2017

(30) Foreign Application Priority Data

Dec. 26, 2014 (JP) .................................. 2014-264974

(51) Int. Cl.
| | |
|---|---|
| *C08L 13/02* | (2006.01) |
| *C08L 15/00* | (2006.01) |
| *C08L 9/04* | (2006.01) |
| *C08L 101/08* | (2006.01) |
| *C08L 33/18* | (2006.01) |
| *F16D 69/02* | (2006.01) |

(52) U.S. Cl.
CPC ............. *C08L 101/08* (2013.01); *C08L 13/02* (2013.01); *C08L 33/18* (2013.01); *F16D 69/02* (2013.01)

(58) Field of Classification Search
CPC .......... C08L 13/02; C08L 15/005; C08L 9/04; C08L 33/18; C08L 33/20; C08L 33/22
See application file for complete search history.

(56) References Cited

U.S. PATENT DOCUMENTS

2012/0130005 A1\* 5/2012 Senda ................... C08F 220/42
524/511
2013/0280459 A1\* 10/2013 Nakashima ............. C08L 13/00
428/36.8

FOREIGN PATENT DOCUMENTS

JP         S61-218636 A      9/1986

OTHER PUBLICATIONS

Mar. 22, 2016 Search Report issued in International Patent Application No. PCT/JP2015/085465.

\* cited by examiner

*Primary Examiner* — Vu A Nguyen
(74) *Attorney, Agent, or Firm* — Oliff PLC

(57) ABSTRACT

A latex for friction member use including rubber particles comprised of a carboxyl group-containing highly saturated nitrile rubber containing α,β-ethylenically unsaturated nitrile monomer units in a ratio of 10 to 60 wt % and having an iodine value of 120 or less, wherein a difference Δd (Δd=d90−d50) between a volume cumulative 90% particle size (d90) of the rubber particles and volume cumulative 50% particle size (d50) of the rubber particles which are measured by a light scattering method is 0.0240 μm or more is provided.

7 Claims, No Drawings

LATEX FOR FRICTION MEMBER USE AND FRICTION MEMBER

TECHNICAL FIELD

The present invention relates to a latex for friction member use able to give a friction member excellent in heat resistance and friction characteristics and to a friction member obtained using that latex.

BACKGROUND ART

In a friction member such as a brake lining, disk pad, and clutch facing for automobile or industrial machinery use, in the past asbestos was used as the base material, but due to the environmental issues posed by asbestos, development of non-asbestos friction members has been desired. At the present time, friction members using, as alternative materials to asbestos, fiber base materials such as glass fiber, carbon fiber, aramid fiber, rock wool, ceramic fiber, and various steel fibers are being developed and used. Friction members using such a fiber base material are usually produced by adhering a resin composition containing a thermosetting resin or rubber ingredient etc. on the fiber base material in order to improve the friction characteristics etc.

For example, Patent Document 1 discloses a method of production of a clutch facing comprising adhering a thermosetting resin composition composed of a thermosetting resin such as a phenol resin, urea resin, melamine resin, and epoxy resin in which a rubber ingredient is mixed onto a base material fiber, further adhering a binder composition containing a rubber compound, pre-forming this base material fiber into a spiral shape or laminate shape, then hot pressing the obtained pre-formed article.

However, the clutch facing obtained by the art of the above Patent Document 1 is not sufficient in heat resistance (for example, large in an amount of change of friction characteristics after heat aging), so improvement of the heat resistance is desired.

RELATED ART

Patent Documents

Patent Document 1: Japanese Patent Publication No. 61-218636A

SUMMARY OF THE INVENTION

Problem to be Solved by the Invention

The present invention has as its object to provide a latex for friction member use able to give a friction member excellent in heat resistance and friction characteristics and to a friction member obtained using that latex.

Means for Solving the Problem

The present inventors engaged, in intensive research to solve this problem and as a result discovered that the above object can be achieved by a latex comprising rubber particles comprised of a carboxyl group-containing highly saturated nitrile rubber containing α,β-ethylenically unsaturated nitrile monomer units in a ratio of 10 to 60 wt % and having an iodine value of 120 or less, and controlling a difference Δd between volume cumulative 90% particle size (d90) of the rubber particles and volume cumulative 50% particle size (d50) of the rubber particles to a predetermined range and thereby completed the present invention.

That is, according to the present invention, there is provided a latex for friction member use comprising rubber particles comprised of a carboxyl group-containing highly saturated nitrile rubber containing α,β-ethylenically unsaturated nitrile monomer units in a ratio of 10 to 60 wt % and having an iodine value of 120 or less, wherein a difference Δd (Δd=d90−d50) between a volume cumulative 90% particle size (d90) of the rubber particles and volume cumulative 50% particle size (d50) of the rubber particles which are measured by a light scattering method is 0.0240 μm or more.

In the latex for friction member use of the present invention, preferably the carboxyl group-containing highly saturated nitrile rubber contains 10 to 60 wt % of α,β-ethylenically unsaturated nitrile monomer units, 0.1 to 20 wt % of carboxyl group-containing monomer units, and 20 to 90 wt % of conjugated diene monomer units (including hydrogenated ones). More preferably, the carboxyl group-containing monomer units are α,β-ethylenically unsaturated monocarboxylic acid monomer units.

Further, according to the present invention, there is provided a latex composition for friction member use comprising the above latex for friction member use and a thermosetting resin.

In the latex composition for friction member use of the present invention, preferably the thermosetting resin is one or more types selected from an epoxy resin and phenol resin.

In the latex composition for friction member use of the present invention, preferably the content of the thermosetting resin is 40 to 500 parts by weight with respect to 100 parts by weight of the carboxyl group-containing highly saturated nitrile rubber.

Furthermore, according to the present invention, there is provided a friction member obtained by adhering the above latex composition for friction member use to a base material.

Effects of Invention

According to the present invention, it is possible to provide a latex for friction member use able to give a friction member excellent in heat resistance and friction characteristics and to a friction member obtained using that latex.

DESCRIPTION OF EMBODIMENTS

Latex for Friction Member Use

The latex for friction member use of the present invention comprises rubber particles comprised of a carboxyl group-containing highly saturated nitrile rubber containing α,β-ethylenically unsaturated nitrile monomer units in a ratio of 10 to 60 wt % and having an iodine value of 120 or less, and has a difference Δd (Δd=d90−d50) between a volume cumulative 90% particle size (d90) of the rubber particles and volume cumulative 50% particle size (d50) of the rubber particles which are measured by a light scattering method is 0.0240 μm or more.

According to the present invention, by making the latex for friction member use one containing carboxyl group-containing highly saturated nitrile rubber having the above constitution and by making the volume cumulative particle sizes of the rubber particles of the carboxyl group-containing highly saturated nitrile rubber the above specific ranges, it is possible to make the obtained friction member excellent in heat resistance and friction characteristics when mixing that latex with a thermosetting resin to obtain a latex composition for friction member use, and adhering that on a base material to obtain the friction member.

Here, it is generally known that in carboxyl group-containing highly saturated nitrile rubber, the heat resistance can be improved by performing a hydrogenation reaction and lowering the iodine value. On the other hand, according to the discoveries of the present inventors, when performing a hydrogenation reaction and lowering the iodine value, sometimes the compatibility with a thermosetting resin falls and as a result when mixing the latex with a thermosetting resin and adhering it on a base material to obtain a friction member, a sufficient effect of improvement of the heat resistance sometimes cannot be obtained.

As opposed to this, according to the present invention, it was discovered that by including carboxyl group-containing highly saturated nitrile rubber having the above constitution and making the volume cumulative particle sizes of rubber particles of the carboxyl group-containing highly saturated nitrile rubber the above specific ranges, it is possible to improve the compatibility with a thermosetting resin and as a result possible to make the obtained friction member excellent in heat resistance and friction characteristics.

Below, first, the carboxyl group-containing highly saturated nitrile rubber forming the latex for friction member use of the present invention will be explained. The carboxyl group-containing highly saturated nitrile rubber forming the latex for friction member use of the present invention is a nitrile rubber containing a carboxyl group which contains α,β-ethylenically unsaturated nitrile monomer units in a ratio of 10 to 60 wt % and has an iodine value of 120 or less.

The carboxyl group-containing highly saturated nitrile rubber forming the latex for friction member use of the present invention can, for example, be obtained by copolymerizing an α,β-ethylenically unsaturated nitrile monomer, a carboxyl group-containing monomer, and, in accordance with need, a monomer able to copolymerize with these.

The α,β-ethylenically unsaturated nitrile monomer is not particularly limited, but one having 3 to 18 carbon atoms is preferable, while one having 3 to 9 carbon atoms is particularly preferable. As specific examples, acrylonitrile, methacrylonitrile, α-chloroacrylonitrile, etc. may be mentioned. Among these as well, acrylonitrile is preferable. These α,β-ethylenically unsaturated nitrile monomers may be used as single types alone or may be used as two types or more combined.

In the carboxyl group-containing highly saturated nitrile rubber, the content of the α,β-ethylenically unsaturated nitrile monomer units is 10 to 60 wt %, preferably 12 to 58 wt %, more preferably 16 to 50 wt %. If the α,β-ethylenically unsaturated nitrile monomer units is too small in content, the compatibility when mixed with a thermosetting resin deteriorates and as a result the obtained friction member ends up falling in heat resistance. On the other hand, if too great, the elasticity and cold resistance end up falling.

The carboxyl group-containing monomer is not particularly limited as long as a monomer able to copolymerize with the α,β-ethylenically unsaturated nitrile monomer and having at least one unsubstituted (free) carboxyl group which is not esterified etc. By using a carboxyl group-containing monomer, it is possible to introduce a carboxyl group into the nitrile rubber.

As the carboxyl group-containing monomer used in the present invention, for example, an α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, the carboxyl group-containing monomer may also contain a monomer where the carboxyl groups of these monomers form carboxylate. Furthermore, the anhydride of α,β-ethylenically unsaturated polyvalent carboxylic acid also form a carboxylic group by cleaving an acid anhydride group after polymerization, so can be used as the carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, a butenedioic acid such as fumaric acid and maleic acid, itaconic acid, citraconic acid, mesaconic acid, glutaconic acid, allylmalonic acid, teraconic acid, etc, may be mentioned. Further, as the anhydride of an α,β-unsaturated polyvalent carboxylic acid, maleic anhydride, itaconic anhydride, citraconic anhydride, etc, may be mentioned.

As the α,β-ethylenically unsaturated dicarboxylic acid mono ester monomer, a maleic acid monoalkyl ester such as monomethyl maleate, monoethyl maleate, monopropyl maleate, and mono-n-butyl maleate; a maleic acid monocycloalkyl ester such as monocyclopenyl maleate, monocyclohexyl maleate, and nonocycloheptyl maleate; a maleic acid monnalkylcycloalkyl ester such as monomethylcyclopentyl maleate and monoethylcyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, monocyclohexyl fumarate, and monocycloheptyl fumarate; a fumaric acid monoalkylcycloalkyl ester such as monomethylcyclopentyl fumarate and monoethylcyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkylcycloalkyl ester such as monomethylcyclopentyl citraconate and monoethylcyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkylcycloalkyl ester such as monomethylcyclopentyl itaconate and monoethylcyclohexyl itaconate; etc. may be mentioned.

The carboxyl group-containing monomer may be used as single types alone or as a plurality of types combined. Among these, since the effect of the present invention becomes much more remarkable, an α,β-ethylenically unsaturated monocarboxylic acid monomer is preferable, an acrylic acid or methacrylic acid is more preferable, and methacrylic acid is still more preferable.

In the carboxyl group-containing highly saturated nitrile rubber, the content of the carboxyl group-containing monomer units is preferably 0.1 to 20 wt %, more preferably 0.5 to 15 wt %, still more preferably 1 to 10 wt %. By making the content of the carboxyl group-containing monomer units the above range, it is possible to improve the compatibility with a thermosetting resin and adhesiveness with a base material. On the other hand, when not containing carboxyl group-containing monomer units, the adhesiveness with a base material and the bending fatigue resistance end up becoming inferior.

Further, the carboxyl group-containing highly saturated nitrile rubber forming the latex for friction member use of the present invention is preferably one which is obtained by copolymerizing a conjugated diene monomer with an α,β-ethylenically unsaturated nitrile monomer and carboxyl group-containing monomer from the viewpoint of obtaining rubber elasticity.

As the conjugated diene monomer, a conjugated diene monomer having 4 to 6 carbon atoms such as 1,3-butadiene, isoprene, 2,3-dimethyl-1,3-butadiene, 1,3-pentadiene, and chloroprene is preferable, 1,3-butadiene and isoprene are more preferable, and 1,3-butadiene is particularly preferable. The conjugated diene monomer may be used as single types alone or as a plurality of types combined.

In the carboxyl group-containing highly saturated nitrile rubber, the content of the conjugated diene monomer units is preferably 20 to 90 wt %, more preferably 35 to 85 wt %, still more preferably 50 to 80 wt %. By making the content of the conjugated diene monomer units the above range, it is possible to make the heat resistance and chemical stability excellent and to suitably improve the rubber elasticity. Note that, the content of the conjugated diene monomer units is the content including also the hydrogenated part in the case of performing the later explained hydrogenation.

Further, the carboxyl group-containing highly saturated nitrile rubber forming the latex for friction member use of the present invention may be one which is obtained by copolymerizing, with an α,β-ethylenically unsaturated nitrile monomer, carboxyl group-containing monomer, and conjugated diene monomer, another monomer able to copolymerize with these. As such another monomer, ethylene, α-olefin monomer, aromatic vinyl monomer, α,β-ethylenically unsaturated carboxylic acid ester monomer (except those corresponding to the above "carboxyl group-containing monomer"), fluorine-containing vinyl monomer, copolymerizable antiaging agent, etc. may be illustrated.

As the α-olefin monomer, one having 3 to 12 carbon atoms is preferable. For example, propylene, 1-butene, 4-methyl-1-pentene, 1-hexene, 1-octene, etc. may be mentioned.

As the aromatic vinyl monomer, for example, styrene, α-methylstyrene, vinylpyridine, etc. may be mentioned.

As the α,β-ethylenically unsaturated carboxylic acid ester monomer, for example, a (meth)acrylic acid ester (abbreviated as "methacrylic acid ester and acrylic acid ester", same below) having an alkyl group having 1 to 18 carbon atoms such as methyl acrylate, ethyl acrylate, n-butyl acrylate, n-dodecyl acrylate, methyl methacrylate, and ethyl methacrylate; a (meth)acrylic acid ester having an alkoxyalkyl group having 2 to 12 carbon atoms such as methoxymethyl acrylate, methoxyethyl acrylate, and methoxyethyl methacrylate; a (meth)acrylic acid ester having a cyanoalkyl group having 2 to 12 carbon atoms such as α-cyanoethyl acrylate, α-cyanoethyl methacrylate, and α-cyanobutyl methacrylate; a (meth)acrylic acid ester having a hydroxyalkyl group having 1 to 12 carbon atoms such as 2-hydroxethyl acrylate, 2-hydroxpropyl acrylate, and 2-hydroxyethyl methacrylate; a (meth)acrylic acid ester having a fluoroalkyl group having 1 to 12 carbon atoms such as trifluoroethyl acrylate and tetrafluoropropyl methacrylate; an α,β-ethylenically unsaturated dicarboxylic acid dialkyl ester such as dimethyl maleate, dimethyl fumarate, dimethyl itaconate, and diethyl itaconate; a dialkylamino group-containing α,β-ethylenically unsaturated carboxylic acid ester such as dimethylaminomethyl acrylate and diethylaminoethyl acrylate; etc. may be mentioned.

As the fluorine-containing vinyl monomer, for example, fluoroethylvinyl ether, fluoropropylvinyl ether, 0-trifluoromethylstyrene, vinyl pentafluorobenzoate, difluoroethylene, tetrafluoroethylene, etc. may be mentioned.

As the copolymerizable antiaging agent, for example, N-(4-anilinophenyl) acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, etc. may be mentioned.

These other copolymerizable monomers may be used as a plurality of types together. The content of the units of the other monomer is preferably 50 wt % or less with respect to the total monomer units, more preferably 30 wt % or less, still more preferably 10 wt % or less.

The carboxyl group-containing highly saturated nitrile rubber forming the latex for friction member use of the present invention has an iodine value of preferably 120 or less, more preferably 60 or less, still more preferably 40 or less, particularly preferably 30 or less. By making the iodine value 120 or less, the heat resistance can be improved.

The carboxyl group-containing highly saturated nitrile rubber forming the latex for friction member use of the present invention has a polymer Mooney viscosity ($ML_{1+4}$, 100° C.) of preferably 10 to 200, more preferably 15 to 150, still more preferably 15 to 100, particularly preferably 30 to 70. By making the polymer Mooney viscosity the above range, it becomes possible to make the mechanical characteristics good while improving the workability.

Further, in the carboxyl group-containing highly saturated nitrile rubber forming the latex for friction member use of the present invention, the content of the carboxyl group, that is, the number of moles of carboxyl group per 100 g of the carboxyl group-containing nitrile rubber, is preferably $5 \times 10^{-4}$ to $5 \times 10^{-1}$ ephr, more preferably $1 \times 10^{-3}$ to $1 \times 10^{-1}$ ephr, particularly preferably $5 \times 10^{-3}$ to $6 \times 10^{-2}$ ephr. By making the content of carboxyl group of the carboxyl group-containing highly saturated nitrile rubber the above range, it becomes possible to make the adhesiveness with a base material excellent.

The latex for friction member use of the present invention is one containing rubber particles comprised of the above-mentioned carboxyl group-containing highly saturated nitrile rubber. The difference Δd (Δd=d90−d50) between the volume emulative 90% particle size 90) and the volume cumulative 50% particle size (d50) of the rubber particles is 0.0240 r or more. By making the difference Δd (Δd=d90−d50) between the volume cumulative 90% particle size (d90) and the volume cumulative 50% particle size (d50) 0.0240 μm or more, it is possible to raise the compatibility with a thermosetting resin and possible to make the obtained friction member excellent in heat resistance and friction characteristics when mixing the latex with the thermosetting resin to obtain the latex composition for friction member use and adhering this on the base material to obtain a friction member.

In the present invention, the difference Δd (Δd=d90−d50) of the volume cumulative 90% particle size (d90) and the volume cumulative 50% particle size (d50) of the rubber particles forming the latex for friction member use can be obtained by measuring the latex for friction member use using an optical scattering diffraction particle size measurement equipment etc, to measure the volume cumulative 50% particle size (d50) and the volume cumulative 90% particle size (d90) and calculating the difference Δd of these. The latex for friction member use of the present invention has a difference Δd of these of 0.0240 μm or more, preferably 0.0260 μm or more, more preferably 0.0200 μm or more. Further, the upper limit of the difference Δd is not particularly limited, but is preferably 2.0 μm or less, more preferably 1.1 μm or less. If the difference Δd is less than 0.0240

µm, the compatibility with the thermosetting resin becomes low and, when mixed with the thermosetting resin to obtain the latex composition for friction member use and adhering this on the base material to obtain a friction the obtained friction member ends up deteriorating in heat resistance and friction characteristics.

Note that, the latex for friction member use of the present invention may be one having a difference Δd (Δd=d90−d50) of the volume cumulative 90% particle size (d90) and volume cumulative 50% particle size (d50) of the rubber particles comprised of carboxyl group-containing highly saturated nitrile rubber in the above range, but from the viewpoint of being able to raise more the heat resistance and friction characteristics of the Obtained friction member, the volume cumulative 90% particle size (d90) is preferably 0.05 to 10 µm, more preferably 0.06 to 5 µm under conditions of Δd (Δd=d90−d50) in the above range, while the volume cumulative 50% particle size (d50) is preferably 0.04 to 8 µm, more preferably 0.05 to 4 µm under conditions of Δd (Δd=d90−d50) in the above range.

In the present invention, the method for making the difference Δd (Δd=d90−d50) between the volume cumulative 90% particle size (d90) and volume cumulative 50% particle size (d50) of the rubber particles comprised of carboxyl group-containing highly saturated nitrile rubber forming the latex for friction member use of the present invention in the above range is not particularly limited, but the method of adjusting the composition of the carboxyl group-containing highly saturated nitrile rubber, the method of adjusting the polymerization conditions of the carboxyl group-containing highly saturated nitrile rubber forming the latex for friction member use, etc. may be mentioned. For example, the method of controlling the polymerization conversion rate at the time of polymerization of the carboxyl group-containing highly saturated nitrile rubber to preferably 60 to 95%, more preferably 75 to 93%, particularly preferably 75% to 87%, the method of using a pH adjuster etc. to control the pH at the time of the hydrogenation reaction to preferably 4 to 8 in range, more preferably 5 to 7.5 in range, the method of controlling the pH after hydrogenation to 7.0 to 11.5, the method of controlling the amount of emulsifier used at the time of polymerization, the method of adjusting the phase-transfer emulsification conditions at the time of production, etc. may be mentioned, but the invention is not particularly limited to these methods.

Further, the latex for friction member use of the present invention preferably has a pH of 7.0 to 11.5 in range, more preferably 7.5 to 11.0 in range, particularly preferably 7.5 to 9.4 in range. By making the pH the above range, it is possible to further increase the compatibility with a thermosetting resin and thereby possible to make the obtained friction member better in heat resistance and friction characteristics.

The method of production of the latex for friction member use of the present invention is not particularly limited, but the latex is obtained by copolymerizing the above-mentioned monomers and, according to need, hydrogenating the carbon-carbon double bonds in the obtained copolymer. The polymerization method is not particularly limited and may be based on the known emulsion polymerization method or solution polymerization method, but from the viewpoint of industrial productivity, the emulsion polymerization method is preferable. At the time of emulsion polymerization, it is possible to use normally used secondary polymerization materials in addition to the emulsifier, polymerization initiator, and molecular weight adjuster.

The emulsifier is not particularly limited, but, for example, a nonionic emulsifier such as a polyoxyethylenealkyl ether, polyoxyethylenealkylphenol ether, polyoxyethylenealkyl ester, and polyoxyethylene sorbitan alkyl ester; an anionic emulsifier such as a salt of a fatty acid such as myristic acid, palmitic acid, oleic acid, and linoleic acid, an alkylbenzene sulfonic acid salt such as sodium dodecylbenzene sulfonate, a higher alcohol sulfuric acid ester salt, and alkylsulfosuccinic acid salt; a copolymerizable emulsifier such as a sulfo ester of an α,β-unsaturated carboxylic acid, a sulfate ester of α,β-unsaturated carboxylic acid, and a sulfoalkyl aryl ether; etc. may be mentioned. The amount of the emulsifier added is preferably 0.1 to 10 parts by weight with respect to 100 parts by weight of the monomers used for the polymerization, more preferably 0.5 to 5 parts by weight.

The polymerization initiator is not particularly limited so long as a radical initiator, but an inorganic peroxide such as potassium persulfate, sodium persulfate, ammonium persulfate, potassium perphosphate, and hydrogen peroxide; an organic peroxide such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; an azo compound such as azobisisobutyronitrile, azobis-2,4-dimethylvaleronitrile, azobiscyclohexane carbonitrile, and methyl azobisisobutyrate; etc. may be mentioned. These polymerization initiators may be used alone or as two types or more combined. As the polymerization initiator, an inorganic or organic peroxide is preferable. When using a peroxide as a polymerization initiator, it is possible to combine it with a reducing agent such as sodium bisulfate and ferrous sulfate for use as a redox type polymerization initiator. The amount of addition of the polymerization initiator is preferably 0.01 to 2 parts by weight with respect to 100 parts by weight of the monomers used for the polymerization.

The molecular weight adjuster is not particularly limited, but a mercaptan such as t-dodecylmercaptan, n-dodecylmercaptan, and octylmercaptan; a halogenated hydrocarbon such as carbon tetrachloride, methylene chloride, and methylene bromide; an α-methylstyrene dimer; a sulfur-containing compound such as tetraethylthiuram disulfide, dipentamethylenethiuram disulfide, and diisopropylxantogen disulfide, etc, may be mentioned. These may be used alone or as two types or more combined. Among these as well, a mercaptan is preferable, while t-dodecylmercaptan is more preferable.

For the medium in the emulsion polymerization, usually water is used. The amount of the water is preferably 80 to 500 parts by weight with respect to 100 parts by weight of the monomers used for the polymerization, more preferably 80 to 300 parts by weight.

At the time of emulsion polymerization, furthermore, as necessary, a secondary polymerization material such as a stabilizer, dispersant, pH adjuster, deoxidizing agent, and particle size adjuster may be used. If using these, the types and amounts of use are not particularly limited.

The polymerization conversion rate in the emulsion polymerization is preferably made 60 to 95% in range, more preferably 75 to 93% in range, from the viewpoint that it is possible to control the difference Δd (Δd=d90−d50) between the volume cumulative 90% particle size (d90) and volume cumulative 50% particle size (d50) of rubber particles comprised of the carboxyl group-containing highly saturated nitrile rubber forming the obtained latex for friction member use to the Above range.

Further, in the present invention, the obtained copolymer may, as needed, be treated to hydrogenate the copolymer (hydrogenation reaction). The hydrogenation may be performed by a known method. The oil layer hydrogenation method where a copolymer is hydrogenated at the oil layer after solidifying the latex of a copolymer obtained by emulsion polymerization, the aqueous layer hydrogenation method where the latex of a copolymer obtained in the above method is hydrogenated as it is, etc. may be mentioned.

In the aqueous layer hydrogenation method, preferably water is added to the latex of the copolymer prepared by the above emulsion polymerization in accordance with need so as to dilute the latex and perform a hydrogenation reaction. The aqueous layer hydrogenation method includes the aqueous phase direct hydrogenation method of supplying hydrogen to the reaction system in the presence of a hydrogenation catalyst for hydrogenation and the aqueous phase indirect hydrogenation method of performing reduction in the presence of an oxidant, reducing agent, and activator for hydrogenation, but among these, the aqueous phase direct hydrogenation method is preferable.

In the aqueous phase direct hydrogenation method, the concentration of the copolymer at the aqueous layer (concentration in latex state) is preferably 40 wt % or less so as to prevent aggregation. The hydrogenation catalyst is not particularly limited so long as a compound which is insoluble in water. As specific examples, in palladium catalysts, a palladium salt; of a carboxylic acid such as formic acid, propionic acid, lauric acid, succinic acid, oleic acid, and phthalic acid; a chloride of palladium such as palladium chloride, dichloro(cyclooctadiene) palladium, dichloro(norbornadiene)palladium, and ammonium hexachloropalladate (IV); an iodide such as palladium iodide; palladium sulfate dihydrate; etc. may be mentioned. Among these as well, a palladium salt of carboxylic acid, dichloro(norbornadiene) palladium, and ammonium hexachloropalladate (IV) are particularly preferable. The amount of use of the hydrogenation catalyst may be suitably determined, but is preferably 5 to 6000 wt ppm with respect to the copolymer obtained by polymerization, more preferably 10 to 4000 wt ppm.

In the aqueous layer direct hydrogenation method, after the hydrogenation reaction, the hydrogenation catalyst in the latex is removed. As the method, for example, it is possible to employ the method of adding an absorbent such as activated carbon and an ion exchange resin and making it absorb the hydrogenation catalyst while stirring, then filtering out or centrifugally separating the latex. It is also possible to not remove the hydrogenation catalyst but leave it in the latex. Further, after the end of the hydrogenation reaction, in accordance with need, a pH adjuster etc. may be added to adjust the pH of the latex.

Latex Composition for Friction Member Use

The latex composition for friction member use of the present invention comprises the above-mentioned latex for friction member use of the present invention and a thermosetting resin.

The thermosetting resin is not particularly limited so long as a resin which cures upon heating, but from the viewpoint of the compatibility with the above-mentioned latex for friction member use of the present invention, a water soluble thermosetting resin is preferable. For example, a phenol resin, urea resin, melamine resin, epoxy resin, etc. may be mentioned. Among these as well, from the viewpoint that it is possible to make the action and effect of the present invention more remarkable, a phenol resin or epoxy resin is preferable.

The epoxy resin is not particularly limited as long as a resin having an epoxy group and exhibiting solubility in water. A bisphenol A type epoxy resin, bisphenol AD type epoxy resin, bisphenol F type epoxy resin, bisphenol AF type epoxy resin, phenol novolac type epoxy resin, cresol novolac type epoxy resin, α-naphthol novolac type epoxy resin, bisphenol A novolac type epoxy resin, etc. can be used without limitation, but among these as well, a bisphenol A novolac type epoxy resin is preferable.

As the phenol resin, it is possible to use any general used phenol resin obtained by condensation of a phenol and aldehyde in the presence of an acidic catalyst or a basic catalyst.

As the phenol used for preparing the phenol resin, carbolic acid, m-cresol, p-cresol, o-cresol, p-alkylphenol, etc. may be preferably used. Mixtures of these way also be used. Further, as the aldehyde used for preparing the phenol resin, formaldehyde, acetoaldehyde, etc. may be preferably used. Mixtures of these may also be used.

Further, as the phenol resin, either a resol type phenol resin or a novolac type phenol resin can be used. Furthermore, various types of modified phenol resins can be used. These may also be used blended together. Furthermore, as the phenol resin which is used, it may be selected and used in accordance with the objective properties such as the extent of condensation of the phenol with the aldehyde, molecular weight, residual rate of the residual monomers, etc. Further, various grades of resin differing in physical properties are also commercially available, so such commercially available products nay also be suitably used.

Note that, the "phenol resin" referred to here includes so-called phenol resin precursors before 3D cross-linking to form a cured phenol resin. Further, as the modified phenol resin, a resol type phenol resin or a novolac type phenol resin modified by various thermoplastic resins may be mentioned. The thermoplastic resin used for modification of the modified phenol resin is not particularly limited, but an elastomer such as nitrile rubber, isoprene rubber, polybutadiene rubber, acrylic rubber, and ethyleneacrylic rubber or a polyamide resin, phenoxy resin, polyvinylbutyral resin, polyethylene terephthalate, polyurethane, methyl methacrylate-based copolymer, polyester resin, cellulose acetate polymer, polyvinyl alcohol, etc. may be mentioned.

In the latex composition for friction member use of the present invention, the amount of the thermosetting resin is preferably 40 to 500 parts by weight with respect to 100 parts by weight of the carboxyl group-containing highly saturated nitrile rubber contained in the latex for friction member use, more preferably 50 to 450 parts by weight, still more preferably 60 to 400 parts by weight. By making the amount of the thermosetting resin the above range. When adhering the latex composition for friction member use of the present invention to the base material to obtain the friction member, the obtained friction member can be made higher in heat resistance and friction characteristics.

Further, the latex composition for friction member use of the present invention preferably further contains a friction adjuster. As the friction adjuster, a known powder of an inorganic substance such as calcium carbonate, magnesium carbonate, zinc oxide, barium sulfate, clay, talc, carbon black, graphite, alumina, mica, fluorite, zirconia, hematite, silica, antimony sulfide, iron sulfide, molybdenum sulfide, and sulfur, powder of a metal such as iron, lead, and copper, powder of an organic substance such as cashew dust, rubber dust, and powders of various cured resins, calcium silicate staple fiber, etc. is used. Among these, from the viewpoint of better improving the friction characteristics, carbon black is preferable.

In the latex composition for friction member use of the present invention, the amount of the friction adjuster is preferably 10 to 1000 parts by weight with respect to 100 parts by weight of the carboxyl group-containing highly saturated nitrile rubber contained in the latex for friction member use, more preferably 20 to 800 parts by weight, still more preferably 30 to 500 parts by weight. By making the amount of the friction adjuster the above range, it is possible to suitably improve the friction characteristics.

Further, the latex composition for friction member use of the present invention may further contain a dispersant such as methyl cellulose, carboxymethyl cellulose, polyvinyl pyrrolidone, polyvinyl alcohol, polyvinylmethyl ether, and polyvinylethyl ether; a flexibilizer such as a glycol; surfactant; etc.

The method of production of the latex composition for friction member use of the present invention is not particularly limited, but, for example, the composition may be prepared by mixing, into the above-mentioned latex for friction member use of the present invention, a thermosetting resin and, as needed, a friction adjuster etc. At that time, the thermosetting resin may be mixed in as it is or may be made to dissolve or disperse in water and mixed into it in the state of a solution or dispersion.

Friction Member

The friction member of the present invention is obtained by adhering the above-mentioned latex composition for friction member use of the present invention to a base material.

The base material is not particularly limited, but usually a fiber base material is used. As the fiber base material, an inorganic fiber or organic fiber such as copper, stainless steel, brass, aramid, carbon, glass, potassium titanate, rock wool, and ceramic etc. may be mentioned.

The method of production of the friction member of the present invention is not particularly limited, but, for example, the friction member can be produced by immersing the base material in the above-mentioned latex composition for friction member use of the present invention to thereby make the latex composition for friction member use of the present invention adhered to the surface of the base material and if necessary drying the result. Further, at that time, to promote the curing of the thermosetting resin contained in the latex composition for friction member use of the present invention, after drying, it is also possible to heat it as required. The heating temperature for curing the resin may be suitably selected in accordance with the type of the thermosetting resin which is used, but is usually 120 to 240° C., while the heating time is usually 30 minutes to 8 hours.

The friction member of the present invention is one obtained using the composition containing the above-mentioned latex for friction member use of the present invention, so is excellent in heat resistance and friction characteristics. For this reason, utilizing such characteristics, the friction member is suitable as a awake lining, disk pad, clutch facing, etc, for automobiles and industrial machinery.

EXAMPLES

Below, the present invention will be explained based on more detailed examples, but the present invention is not limited to these examples. Note that, below, "part" is based on weight unless particular indicated otherwise. Further, the tests and evaluations were performed as follows:

Iodine Value

The iodine value of the carboxyl group-containing (highly saturated) nitrile rubber was measured based on JIS K6235.

Measurement of Content of Acrylonitrile Units

The ratio of content of acrylonitrile units was calculated by measuring the content of nitrogen in the carboxyl group-containing (highly saturated) nitrile rubber by the Kjeldahl method in accordance with JIS K6384.

Measurement of Rubber Particles in Latex

The volume average particle size of the rubber particles of the carboxyl group-containing (highly saturated) nitrile rubber forming the latex of the carboxyl group-containing (highly saturated) nitrile rubber was measured using an optical scattering diffraction particle size measurement equipment (LS-230 made by Beckman-Coulter). Further, from the measurement results, the volume emulative 90% particle size (d90) and volume cumulative 50% particle size (d50) were found. Using these results, the difference Δd (Δd=d90−d50) was calculated.

Measurement of Amount of Metal in Latex.

The latex of the carboxyl group-containing (highly saturated) nitrile rubber was decomposed by acid, then quantitative analysis was performed by the ICP-AES method to measure the amount of metal in the latex. Note that, for the measurement, an ICP optical emission spectrometer ("Optima 4300DV", made by Perkins Elmer) was used.

Friction Stability Test

A friction member-shaped test piece was measured for surface friction resistance using a Heidon type surface property measuring apparatus (product name "HEIDON-38", made by Shinto Scientific). Note that, the measurement was performed using a ball indenter (SUSφ10) as the measurement tool. The test piece was made to move horizontally under conditions of a test weight of 200 g (vertical load N), a test speed of 1000 mm/min, a movement distance of 15.0 mm, and five back and forth operations. At that time, the frictional force F (units: gf) applied to the dynamic strain amplifier of the Heidon type surface property measuring apparatus was measured. The following formula was used to calculate the coefficient of friction μ.

$$\mu = F/N$$

In this test, the value of the coefficient of friction μ was continuously recorded from the state of the test piece at a standstill to a fixed speed of the test speed of 1000 mm/min. The maximum value of the coefficient of friction μ during this period was defined as the "coefficient of static friction μs", while the value when the coefficient of friction μ become a constant state was defined as the "coefficient of dynamic friction μk".

Further, in this test, the coefficient of friction was measured before and after heat aging when causing heat aging at 150° C. for 96 hours. Based on the following formulas, the amount of change Δμs of the coefficient of static friction μs and the amount of change Δμk of the coefficient of dynamic friction μk were calculated. The smaller the amounts of change Δμs and Δμk, the better the heat resistance and friction characteristics can be evaluated as. Note that, the friction stability test was performed for the later mentioned Examples 1 to 4 and Comparative Examples 1 to 5.

Amount of change Δμs of coefficient of static friction=coefficient of static friction $\mu s_1$ before heat aging−coefficient of static friction $\mu s_2$ after heat aging Amount of change $\Delta\mu k$ of coefficient of dynamic friction=coefficient of dynamic friction $\mu k_1$ before heat aging−coefficient of dynamic friction $\mu k_2$ after heat aging Hardness Stability Test The friction member-shaped test piece was measured for hardness based on JIS K3253-4 using a Micro-IRHD SYSTEM (made by Hildebrand) as a measuring apparatus before and after heat aging when performing heat aging at 150° C. for 96 hours, so as to measure the amount of change of hardness due to heat aging. Note that, the amount of change of hardness due to heat aging is an absolute value found in accordance with the following formula. The smaller the amount of change of hardness, the more excellent the heat resistance can be evaluated as. Note that, the hardness stability test was performed for the later mentioned Examples 1 to 4 and Comparative Examples 1 to 5, Amount of change of hardness=|Hardness before heat aging−hardness after heat aging|

Measurement of Variation of Change of Hardness

A same test as in the above hardness stability test was performed at three locations of a test piece. The difference between the largest value and the smallest value in the measurement results of the amounts of change of hardness of the three locations was calculated. This was defined as the "variation of change of hardness". The smaller the variation of change of hardness, the less unevenness and the better the stability can be evaluated as. Note that, the variation of change of hardness was measured for the later mentioned Examples 1 to 4 and Comparative Examples 1 to 5.

Film-Formability Test

A latex of the carboxyl group-containing (highly saturated) nitrile rubber and an epoxy resin were mixed to obtain a composition for compatibility test use. Using this, the solvent-cast method was used to form a thin film of the composition for compatibility test use on a glass sheet. Further, the obtained thin film was examined for appearance, then the obtained thin film was stretched to measure the holding strength of the thin film. The following criteria were used to evaluate it. Note that, the higher the compatibility between the latex of the carboxyl group-containing (highly saturated) nitrile rubber and the epoxy resin, the better the obtained thin film and, further, the more sufficient the tensile strength, so the higher the following evaluation score, the higher the compatibility of the latex of the carboxyl group-containing (highly saturated) nitrile rubber and the epoxy resin can be judged as. Note that, the film-formability test was performed for the later explained Examples 1 to 4 and Comparative Examples 1 to 5.

3 points: Obtained thin film is excellent in formability and in tensile holding strength as well 2 points: Thin film can be formed, but tensile holding strength is low 1 point: Thin film can be formed, but no tensile holding strength 0 point: Thin film cannot be formed Note that, in the above evaluation, a tensile hold ng strength which is "good" means a state exhibiting a sufficient elasticity and not easily breaking when stretched. Further, a tensile holding strength which is "low" means a state where the film easily ends up breaking when stretched, while "no" tensile holding strength means the state where the film immediately ends up breaking when stretched.

Coefficient of Linear Expansion.

A film-shaped friction member-shaped test piece was measured for the coefficient of linear expansion using a Seiko Instruments "TMA300" in accordance with JIS K 7197. Note that, the coefficient of linear expansion was measured in the later explained Examples 5 to 8 and Comparative Examples 6 to 9.

Measurement of Change Rate of 20% Stress (Heat Aging Resistance)

A film-shaped friction member-shaped test piece was measured for 20% tensile stress in accordance with JIS K6257 (normal oven method) before and after application of load in the case of application of a load at 150° C. for 70 hours by the following method. The film-shaped friction member-shaped test piece was punched by a modified No. 3 dumbbell shaped die to prepare a sample for tensile test use. Using this sample for tensile test use, based on JIS K6251, the tensile strength was measured at a tensile speed of 200 mm/min. The rate of change of the 20% tensile stress was found based on the obtained results of measurement of the tensile strength. Note that, the change rate of 20% stress was measured for the later explained Examples 5 to 8 and Comparative Examples 6 to 9.

Evaluation of Dispersion

The film-shaped friction member-shaped test pieces were visually examined. The dispersion was evaluated by judging test pieces with 3 cm square or more island type uneven color as "Poor" and test pieces without these as "Good". Test pieces evaluated as good in dispersion can be judged as ones with a high compatibility of the latex of the carboxyl group containing (highly saturated) nitrile rubber and phenol resin. Note that, the test for evaluation of dispersion was performed for the later mentioned Examples 5 to 8 and Comparative Examples 6 to 9.

Production Example 1 (Production of Latex of Carboxyl Group-Containing Highly Saturated Nitrile Rubber (A-1))

To a reactor, 180 parts of ion exchanged water, 25 parts of a concentration 10 wt % sodium dodecylbenzene sulfonate aqueous solution, 35 parts of acrylonitrile, 6 parts of methacrylic acid, and 0.5 pert of t-dodecylmercaptan (molecular weight adjuster) were charged in that order. The inside gas was replaced with nitrogen 3 times, then 59 parts of 1,3-butadiene were charged. The reactor was held at 5° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 85.0%, then a water temperature 60° C. rotary evaporator was used to remove the residual monomers to obtain a latex of carboxyl group-containing nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 2,000 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-1). Note that, in this production example, the amount of addition of the pH adjuster was adjusted to give a pH of the obtained latex after hydrogenation of 9.

Further, part of the obtained latex of a carboxyl group-containing highly saturated nitrile rubber (A-1) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-1). The composition of the obtained carboxyl group-containing highly saturated nitrile rubber (a-1) was 34.0 wt % of acrylonitrile units, 60.6 wt % of butadiene units (including saturated parts), and 5.4 wt % of methacrylic acid units. The iodine value was 10. Further, the volume cumulative 90% particle size (d90), volume cumulative 50% particle size (d50), and difference of these (Δd=d90−d50) measured in accordance with the above methods are shown in Table 1.

Production Example 2 (Production of Latex of Carboxyl Group-Containing Highly Saturated Nitrile Rubber (A-2))

To a reactor, 180 parts of ion exchanged water, 25 parts of a concentration 10 wt % sodium dodecylbenzene sulfonate aqueous solution, 39 parts of acrylonitrile, 5 parts of methacrylic acid, and 0.5 part of t-dodecylmercaptan (molecular weight adjuster) were charged in that order. The inside gas was replaced with nitrogen 3 times, then 56 parts of 1,3-butadiene were charged. The reactor was held at 5° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 86.2%, then a water temperature 60° C. rotary evaporator was used to remove the residual monomers to obtain a latex of carboxyl group-containing nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 1,000 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-2). Note that, in this production example, the amount of addition of the pH adjuster was adjusted to give a pH of the obtained latex after hydrogenation of 8.

Further, part of the obtained latex of a carboxyl group-containing highly saturated nitrile rubber (A-2) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-2). The composition of the obtained carboxyl group-containing highly saturated nitrile rubber (a-2) was 38.2 wt % of acrylonitrile units, 56.4 wt % of butadiene units (including saturated parts), and 5.4 wt % of methacrylic acid units. The iodine value was 50. Further, the volume cumulative 90% particle size (d90), volume cumulative 50% particle size (d50), and difference Δd of these (Δd=d90−d50) measured in accordance with the above methods are shown in Table 1.

Production Example 3 (Production of Latex of Carboxyl Group-Containing Highly Saturated Nitrile Rubber (A-3))

To a reactor, 180 parts of ion exchanged water, 25 parts of a concentration 10 wt % sodium dodecylbenzene sulfonate at solution, 41 parts of acrylonitrile, 4 parts of methacrylic acid, and 0.5 part of t-dodecylmercaptan (molecular weight adjuster) were charged in that order. The inside gas was replaced with nitrogen 3 times, then 55 parts of 1,3-butadiene were charged. The reactor was held at 10° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 88.9%, then a water temperature 60° C. rotary evaporator was used to remove the residual monomers to obtain a latex of nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 1,500 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-3). Note that, in this production example, the amount of addition of the pH adjuster was adjusted to give a pH of the obtained latex after hydrogenation of 9.

Further, part of the obtained latex of a carboxyl group-containing highly saturated nitrile rubber (A-3) was taken out, two volumes of methanol was added to solidify it, the result was filtered to take cut the solids (crumbs), then this was dried in vacuo at 60° C. for 12 hours to thereby obtain a solid form carboxyl group-containing highly saturated nitrile rubber (a-3). The composition of the obtained carboxyl group-containing highly saturated nitrile rubber (a-3) was 40.9 wt % of acrylonitrile units, 55.2 wt % of butadiene units (including saturated parts), and 3.9 wt % of methacrylic acid units. The iodine value was 23. Further, the volume cumulative 90% particle size (d90), volume cumulative 50% particle size (d50), and difference Δd of these (Δd=d90−d50) measured in accordance with the above methods are shown in Table 1.

Production Example 4 (Production of Latex of Carboxyl Group-Containing Highly Saturated Nitrile Rubber (A-4))

To a reactor, 180 parts of ion exchanged water, 25 parts of a concentration 10 wt % sodium dodecylbenzene sulfonate aqueous solution, 21 parts of acrylonitrile, 6 parts of methacrylic acid, and 0.3 part of t-dodecylmercaptan (molecular weight adjuster) were charged in that order. The inside gas was replaced with nitrogen 3 times, then 73 parts of 1,3-butadiene were charged. The reactor was held at 10° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 86.6%, then a water temperature 60° C. rotary evaporator was used to remove the residual monomers to obtain a latex of nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 2,100 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-4). Note that, in this production example, the amount of addition of the pH adjuster was adjusted to give a pH of the obtained latex after hydrogenation of 8.

Further, part of the obtained latex of the carboxyl group-containing highly saturated nitrile rubber (A-4) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-4). The composition of the obtained carboxyl group-containing highly saturated nitrile rubber (a-4) was 20.6 wt % of acrylonitrile units, 73.0 wt % of butadiene units (including saturated parts), and 6.4 wt % of methacrylic acid units. The iodine value was 20. Further, the volume cumulative 90% particle size (d90), volume cumulative 50% particle size (d50), and difference Δd of these (Δd=d90−d50) measured in accordance with the above methods are shown in Table 1.

Production Example 5 (Production of Latex of Carboxyl Group-Containing Nitrile Rubber (A-5))

To a reactor, 180 parts of ion exchanged water, 25 parts of a concentration 10 wt % sodium dodecylbenzene sulfonate aqueous solution, 42 parts of acrylonitrile, 6 parts of methacrylic acid, and 0.5 part of t-dodecylmercaptan (molecular weight adjuster) were charged in that order. The inside gas was replaced with nitrogen 3 times, then 52 parts of 1,3-butadiene were charged. The reactor was held at 10° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 95.5%, then a water temperature 60° C. rotary evaporator was used to remove the residual monomers to obtain a latex of carboxyl group-containing nitrile rubber (A-5) (solids concentration of about 30 wt %). Further, the obtained latex had a pH of 10.

Further, part of the obtained latex of a carboxyl group-containing nitrile rubber (A-5) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-5). The composition of the obtained carboxyl group-containing nitrile rubber (a-5) was 41.3 wt % of acrylonitrile units, 52.8 wt % of butadiene units, and 5.9 wt % of methacrylic acid units. The iodine value was 253. Further, the volume cumulative 90% particle size (d90), volume cumulative 50% particle size (d50), and difference Δd of these (Δd=d90−d50) measured in accordance with the above methods are shown in Table 1.

Production Example 6 (Production of Latex of Carboxyl Group-Containing Highly Saturated Nitrile Rubber (A-6))

To a reactor, 180 parts of ion exchanged water, 25 parts of a concentration 10 wt % sodium dodecylbenzene sulfonate aqueous solution, 31 parts of acrylonitrile, 5 parts of methacrylic acid, and 0.3 part of t-dodecylmercaptan (molecular weight adjuster) were charged in that order. The inside gas was replaced with nitrogen 3 times, than 64 parts of 1,3-butadiene were charged. The reactor was held at 10° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 95.3%, then a water temperature 60° C. rotary evaporator was used to remove the residual monomers to obtain a latex of nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 1,500 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-6). Note that, in this production example, the amount of addition of the pH adjuster was adjusted to give a pH of the obtained latex after hydrogenation of 12.

Further, part of the obtained latex of the carboxyl group-containing highly saturated nitrile rubber (A-6) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-6). The composition of the obtained carboxyl group-containing highly saturated nitrile rubber (a-6) was 30.7 wt % of acrylonitrile units, 64.4 wt % of butadiene units (including saturated parts), and 4.9 wt % of methacrylic acid units. The iodine value was 20. Further, the volume cumulative 90% particle size (d90), volume cumulative 50% particle size (d50), and difference Δd of these (Δd=d90−d50) measured in accordance with the above methods are shown in Table 1.

Production Example 7 (Production of Latex of Carboxyl Group-Containing Highly Saturated Nitrile Rubber (A-7))

To a reactor, 180 parts of ion exchanged water, 25 parts of a concentration 10 wt % sodium dodecylbenzene sulfonate aqueous solution, 9 parts of acrylonitrile, 7 parts of methacrylic acid, and 0.45 part of t-dodecylmercaptan (molecular weight adjuster) were charged in what order. The inside gas was replaced with nitrogen 3 times, then 84 parts of 1,3-butadiene were charged. The reactor was held at 10° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 96.2%, then a water temperature 60° C. rotary evaporator was used to remove the residual monomers to obtain a latex of nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 2,000 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-7). Note that, in this production example, the amount of addition of the pH adjuster was adjusted to give a pH of the obtained latex after hydrogenation of 8.

Further, part of the obtained latex of the carboxyl group-containing highly saturated nitrile rubber (A-7) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-7). The composition of the obtained carboxyl group-containing highly saturated nitrile rubber (a-7) was 9.0 wt % of acrylonitrile units, 84.4 wt % of butadiene units (including saturated parts), and 6.6 wt % of methacrylic acid units. The iodine value was 15. Further, the volume cumulative 90% particle size (d90), volume cumulative 50% particle size (d50), and difference Δd of these (Δd=d90–d50) measured in accordance with the above methods are shown in Table 1.

Production Example 8 (Production of Latex of Carboxy Group-Containing Highly Saturated Nitrile Rubber (A-8))

To a reactor, 180 parts of ion exchanged water, 25 parts of a concentration 10 wt % sodium dodecylbenzene sulfonate aqueous solution, 32 parts of acrylonitrile, 5 parts of methacrylic acid, and 0.45 part of t-dodecylmercaptan (molecular weight adjuster) were charged in that order. The inside gas was replaced with nitrogen 3 times, then 63 parts of 1,3-butadiene were charged. The reactor was held at 10° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 84.0%, then a water temperature 60° C. rotary evaporator was used to remove the residual monomers and obtain a latex of nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 1,500 wt ppm with respect to the dry weight of the rubber contained in the latex. A hydrogenation reaction was performed at a hydrogen pressure of 3 MPa and a temperature of 50° C. for 6 hours to obtain a latex of a carboxyl group-containing highly saturated nitrile rubber (A-8). Note that, in this production example, the amount of addition of the pH adjuster was adjusted to give a pH of the obtained latex after hydrogenation of 12.

Further, part of the obtained latex of the carboxyl group-containing highly saturated nitrile robber (A-8) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-8). The composition of the Obtained carboxyl group-containing highly saturated nitrile rubber (a-8) was 31.3 wt % of acrylonitrile units, 63.9 wt % of butadiene units (including saturated parts), and 4.8 wt % of methacrylic acid units. The iodine value was 35. Further, the volume cumulative 90% particle size (d90), volume cumulative 50% particle size (d50), and difference Δd of these (Δd=d90–d50) measured in accordance with the above methods are shown in Table 1.

Example 1

To a glass container, 100 parts (converted to solid content) of the latex of the carboxyl group-containing highly saturated nitrile rubber (a-1) obtained in Production Example 1, 1 part of ion exchanged water, 20 parts (converted to solid content) of carbon black (product name "Aqua-Black®162" made by Tokai Carbon), and 100 parts (converted to solid content) of an epoxy resin (product name "Epicoat 5003W55" made by Mitsubishi. Chemical) were charged. These were mixed to obtain a latex composition. Further, a 7 cm×4 cm aramid fiber base material (flat weave, thickness 0.7 mm) was impregnated in the obtained latex composition at 25° C. for 1 minute to adhere the latex composition. This was dried at 110° C. for 10 minutes by a fan dryer, then was heat treated at 160° C. for 30 minutes to cause it to cure and thereby obtain a friction member-shaped test piece on which a cured product of a latex composition is adhered. Further, the Obtained test piece was used in accordance with the above methods to test it for friction stability, test it for hardness stability, and measure the variation of change of hardness. The results are shown in Table 1.

Further, separate from the above, to a glass container, 100 parts (converted to solid content) of the latex of the carboxyl group-containing highly saturated nitrile rubber (A-1) obtained in Production Example 1 and 100 parts (converted to solid content) of an epoxy resin (product name "Epicoat 5003W55" made by Mitsubishi Chemical) were charged. These were mixed to obtain a composition for compatibility test use. Further, the obtained composition for compatibility test use was used in accordance with the above method to test the film-formability. The results are shown in Table 1.

Examples 2 to 4

Except for using, instead of the latex of a carboxyl group-containing highly saturated nitrile rubber (A-1) obtained in Production Example 1, the latex of a carboxyl group-containing highly saturated nitrile rubber (A-2) obtained in Production Example 2 (Example 2), the latex of a carboxyl group-containing highly saturated nitrile rubber (A-3) obtained in Production Example 3 (Example 3), and the latex of a carboxyl group-containing highly saturated nitrile rubber (A-4) obtained in Production Example 4 (Example 4), the same procedure was followed as in Example 1 to obtain latex compositions and compositions for compatibility test use and the same procedure was followed to evaluate them. The results are shown in Table 1.

Comparative Examples 1 to 4

Except for using, instead of the latex of a carboxyl group-containing highly saturated nitrile rubber (A-1) obtained in Production Example 1, the latex of a carboxyl group-containing nitrile rubber (A-5) obtained in Production Example 5 (Comparative Example 1), the latex of a carboxyl group-containing highly saturated nitrile rubber (A-6) obtained in Production Example 6 (Comparative Example 2), the latex of a carboxyl group-containing highly saturated nitrile rubber (A-7) obtained in Production Example 7 (Comparative Example 3), and the latex of a carboxyl group-containing highly saturated nitrile rubber (A-8) obtained in Production Example 8 (Comparative Example 4), the same procedure was followed as in Example 1 to obtain latex compositions and compositions for compatibility test use and the same procedure was followed to evaluate them. The results are shown in Table 1.

Comparative Example 5

Except for not mixing in the latex of a carboxyl group-containing highly saturated nitrile rubber (A-1) obtained in the Production Example 1, the same procedure was followed as in Example 1 to obtain a composition and the same procedure was followed to evaluate it. Further, in Comparative Example 5, 100 parts (converted to solid content) of an epoxy resin (product name "Epicoat 5003W55" made by Mitsubishi Chemical) was used as the composition for a compatibility test and tested for film-formability in accordance with the above method. The results are shown in Table 1.

TABLE 1

| | | | Examples | | | | Comparative Examples | | | | |
|---|---|---|---|---|---|---|---|---|---|---|---|
| | | | 1 | 2 | 3 | 4 | 1 | 2 | 3 | 4 | 5 |
| Type of carboxyl group-containing (highly saturated) nitrile rubber latex | | | (A-1) | (A-2) | (A-3) | (A-4) | (A-5) | (A-6) | (A-7) | (A-8) | — |
| Characteristics of carboxyl group-containing (highly saturated) nitrile rubber latex | | | | | | | | | | | |
| Rubber composition | Acrylonitrile units | (wt %) | 34.0 | 38.2 | 40.9 | 20.6 | 41.3 | 30.7 | 9.0 | 31.3 | Not adding |
| | Butadiene units (including saturated parts) | (wt %) | 60.6 | 56.4 | 55.2 | 73.0 | 52.8 | 64.4 | 84.4 | 63.9 | |
| | Methacrylic acid units | (wt %) | 5.4 | 5.4 | 3.9 | 6.4 | 5.9 | 4.9 | 6.6 | 4.8 | |
| | Iodine value | | 10 | 50 | 23 | 20 | 253 | 20 | 15 | 35 | |
| | pH | | 9 | 8 | 9 | 8 | 10 | 12 | 8 | 12 | |
| $\Delta d$ ($\Delta d = d_{90} - d_{50}$) of rubber particles | | | 0.0250 | 0.0248 | 0.0274 | 0.0280 | 0.0271 | 0.0210 | 0.1030 | 0.0223 | |
| Composition of latex composition | | | | | | | | | | | |
| Carboxyl group-containing (highly saturated) nitrile rubber latex*) | (parts by weight) | | 100 | 100 | 100 | 100 | 100 | 100 | 100 | 100 | — |
| Epoxy resin*) | (parts by weight) | | 100 | 100 | 100 | 100 | 100 | 100 | 100 | 100 | 100 |
| Carbon black*) | (parts by weight) | | 20 | 20 | 20 | 20 | 20 | 20 | 20 | 20 | 20 |
| Evaluation | | | | | | | | | | | |
| Friction stability test | | | | | | | | | | | |
| Coefficient of static friction $\mu s_1$ before heat aging | | | 0.79 | 1.06 | 0.91 | 0.88 | 1.12 | 1.25 | 0.98 | 0.91 | 2.37 |
| Coefficient of static friction $\mu s_2$ after heat aging | | | 0.66 | 0.91 | 0.76 | 0.74 | 0.24 | 0.97 | 0.71 | 0.68 | 0.72 |
| Amount of change $\Delta \mu s$ of coefficient of static friction ($\Delta \mu s = \mu s_1 - \mu s_2$) | | | 0.13 | 0.15 | 0.15 | 0.14 | 0.88 | 0.28 | 0.27 | 0.23 | 1.65 |
| Coefficient of dynamic friction $\mu k_1$ before heat aging | | | 0.63 | 0.72 | 0.81 | 0.75 | 0.92 | 0.88 | 0.85 | 0.75 | 1.86 |
| Coefficient of dynamic friction $\mu k_2$ after heat aging | | | 0.45 | 0.35 | 0.49 | 0.53 | 0.11 | 0.68 | 0.56 | 0.41 | 0.37 |
| Amount of change $\Delta \mu k$ of coefficient of dynamic friction ($\Delta \mu k = \mu k_1 - \mu k_2$) | | | 0.18 | 0.37 | 0.32 | 0.22 | 0.81 | 0.20 | 0.29 | 0.34 | 1.49 |
| Hardness stability test | | | | | | | | | | | |
| Amount of change of hardness before and after heat aging | | | 0.5 | 1.3 | 1.0 | 0.8 | 31.0 | 8.0 | 10.0 | 4.5 | 42.0 |
| Measurement of variation of change of hardness | | | | | | | | | | | |
| Variation of change of hardness | | | 0.4 | 0.5 | 0.5 | 0.4 | 1.0 | 5.3 | 8.6 | 4.2 | 9.0 |
| Film-formability test | | | | | | | | | | | |
| Appearance of thin film | | | Good | Good | Good | Good | Good | Poor | Poor | Poor | Poor |
| Film-formability | | | 3 | 3 | 3 | 3 | 3 | 0 | 1 | 2 | 1 |

*)Amount converted to solid content

As shown in Table 1, when using a latex containing rubber particles comprised of a carboxyl group-containing highly saturated nitrile rubber containing α,β-ethylenically unsaturated nitrile monomer units in a ratio of 10 to 60 wt % and having an iodine value of 120 or less, and having a difference Δd (Δd=d90−d50) of the volume cumulative 90% particle size (d90) and the volume cumulative 50% particle size (d50) of rubber particles of 0.0240 μm or more, the obtained friction member is small in amount of change Δμs of the coefficient of static friction and amount of change Δμk of the coefficient of dynamic friction before and after heat aging, is small in amount of change of hardness and variation of change of hardness before and after heat aging, is high in stability, and is excellent in heat resistance and friction characteristics (apples 1 to 4). Further, the thin film obtained by mixing the latex satisfying the above conditions with an epoxy resin to obtain a composition and using this is excellent in appearance and excellent in film-formability. From these results, it can be confirmed that a latex satisfying the above conditions is excellent in compatibility with an epoxy resin.

On the other hand, if the carboxyl group-containing nitrile rubber contained in the latex is too high in iodine value, the amount of change Δμs of the coefficient of static friction and the amount of change Δμk of the coefficient of dynamic friction before and after heat aging becomes larger and, furthermore, the amount of change of hardness before and after heat aging becomes larger and the heat resistance becomes inferior (Comparative Example 1).

If using a latex with a, difference Δd (Δd=d90−d50) between the volume cumulative 90% particle size (d90) and the volume cumulative 50% particle size (d50) of the rubber particles of less than 0.0240 μm, the amount of change Δμs of the coefficient of static friction becomes larger, furthermore, the variation of change of hardness before and after heat aging also becomes larger, and the heat resistance is inferior (Comparative Examples 2 and 4).

Further, if the content of the α,β-ethylenically unsaturated nitrile monomer units of the carboxyl group-containing nitrile rubber contained in the latex is too small, the amount of change Δμs of the coefficient of static friction becomes larger, the amount, of change of hardness and variation of change of hardness before and after heat aging also become larger and the heat resistance becomes inferior (Comparative Example 3).

Furthermore, when not using a latex of carboxyl group-containing nitrile rubber, the amount of change Δμs of the coefficient of static friction and the amount of change Δμk of the coefficient of dynamic friction become remarkably large and, furthermore, the amount of change of hardness and variation of change of hardness before and after heat aging also become remarkably large and the heat resistance becomes remarkably inferior (Comparative Example 5).

Production Example 9 (Production of Latex of Carboxyl Group-Containing Highly Saturated Nitrile Rubber (A-9))

To a reactor, 180 parts of ion exchanged water, 25 parts of a concentration 10 wt % sodium dodecylbenzene sulfonate aqueous solution, 21 parts of acrylonitrile, 8 parts of methacrylic acid, and, 0.5 part of t-dodecylmercaptan (molecular weight adjuster) were charged in that order. The inside gas was replaced with nitrogen 3 times, then 71 parts of 1,3-butadiene were charged. The reactor was held at 5° C., 0.1 part of cumen hydroperoxide (polymerization initiator) and suitable amounts of a reducing agent and chelating agent were charged, and the result was stirred while continuing the polymerization reaction. Next, 0.1 part of a concentration 10 wt % hydroquinone aqueous solution (polymerization terminator) was added to stop the polymerization reaction at a polymerization conversion rate of 85.0%, then a water temperature 60° C. rotary evaporator was used to remove the residual monomers and obtain a latex of carboxyl group-containing nitrile rubber (solids concentration of about 30 wt %).

Next, the latex, a palladium catalyst (solution of 1 wt % palladium acetate acetone solution and equal weight of ion exchanged water mixed together), and a pH adjuster were added in an autoclave so that the amount of palladium became 1,500 wt ppm with respect to the dry weight of the rubber contained in the latex hydrogenation reaction was performed at a hydrogen pressure of 3 MPa and a temperature of 50° C. to obtain a latex of a carboxyl group-containing highly saturated nitrile rubber (A-9). Note that, in this production example, the amount of addition of the pH adjuster was adjusted to give a pH of the obtained latex after hydrogenation of 8. Further, the amount of metal of the latex measured in accordance with the above method is shown in Table 2.

Further, part of the obtained latex of a carboxyl group-containing highly saturated nitrile rubber (A-9) was taken out, two volumes of methanol was added to solidify it, the result was filtered to take out the solids (crumbs), then this was dried in vacuo at 60° C. for 12 hours to thereby obtain a solid form carboxyl group-containing highly saturated nitrile rubber (a-9). The composition of the obtained carboxyl group-containing highly saturated nitrile rubber (a-9) is shown in Table 2. Further, the volume cumulative 90% particle size (d90), volume cumulative 50% particle size (d50), and difference Δd of these (Δd=d90−d50) measured in accordance with the above methods are shown in Table 2.

Production Example 10 (Production of Latexes of Carboxyl Group Containing Highly Saturated Nitrile Rubber (A-10) to (A-12))

Except for changing the amounts of use of acrylonitrile, methacrylic acid, and 1,3-butadiene and the hydrogenation conditions and pH adjustment conditions, the same procedure was followed as in Production Example 9 to obtain latexes of carboxyl group-containing highly saturated nitrile rubber (A-10) to (A-12) having the compositions, iodine values, and pHs shown in Table 2. Further, Table 2 shows the volume cumulative 90% particle size (d90), volume cumulative 50% particle size (d50), and difference Δd of these (Δd=d90−d50) measured in accordance with the above methods.

Production Example 11 (Production of Latexes (A-13) and (A-14) of Carboxyl Group Containing Highly Saturated Nitrile Rubber)

Except for changing the amounts of use of acrylonitrile, methacrylic acid, and 1,3-butadiene and changing the pH adjustment conditions and not performing a hydrogenation reaction, the same procedure was followed as in Production Example 9 to obtain latexes of carboxyl group-containing highly saturated nitrile rubber (A-13) and (A-14) having the compositions, iodine values, and pHs shown in Table 2. Further, Table 2 shows the volume cumulative 90% particle size (d90), volume cumulative 50% particle size (d50), and difference Δd of these (Δd=d90−d50) measured in accordance with the above methods.

Production Example 12 (Production of Latexes of Carboxyl Group-Containing Highly Saturated Nitrile Rubber A-15) and (A-16))

Except for changing the amounts of use of the acrylonitrile, methacrylic acid, and 1,3-butadiene, hydrogenation conditions, and pH adjustment conditions, the same procedure was followed as in Production Example 9 to obtain latexes of a carboxyl group-containing highly saturated nitrile rubber (A-15) and (A-16) having the composition, iodine value, and pH shown in Table 2. Further, T Table 2 shows the volume cumulative 90% particle size (d90), volume cumulative 50% particle size (d50), and difference Δd of these (Δd=d90−d50) measured in accordance with the above methods.

Example 5

To a heat resistant vat, 100 parts (converted to solid content) of the latex of a carboxyl group-containing highly saturated nitrile rubber (A-9) obtained in Production Example 9 and 100 parts (converted to solid content) of a phenol resin (product name "Sumilite Resin PR-14170" made by Sumitomo Bakelite) were mixed to obtain a latex composition. Further, to obtained latex composition was air dried for one night, then was dried by a fan drier at 110° C. for 10 minutes. Next, a 5 mm thick die frame was used to press this at 160° C. for 30 minutes to cause it to cure and thereby obtain a film-shaped friction member-shaped test piece of the latex composition. Further, the obtained film-shaped friction member-shaped test piece was used in accordance with the above methods to measure and evaluate the coefficient of linear expansion, change rate of 20% stress, dispersion, and tensile characteristics. The results are shown in Table 2.

Example 6

Except for using, instead of the latex of a carboxyl group-containing highly saturated nitrile rubber (A-9) obtained in Production Example 9, the latex of a carboxyl group-containing highly saturated nitrile rubber (A-10) obtained in Production Example 10 and changing the amount of the phenol resin from 100 parts to 250 parts, the same procedure was followed as in Example 5 to obtain a latex composition and film-shaped friction member-shaped test piece and the same procedure was followed to evaluate them. The results are shown in Table 2.

Example 7

Except for using, instead of the latex of a carboxyl group-containing highly saturated nitrile rubber (A-9) obtained in Production Example 9, the latex of a carboxyl group-containing highly saturated nitrile rubber (A-11) obtained in Production Example 10 and changing the amount of the phenol resin from 100 parts to 250 parts, the same procedure was followed as in Example 5 to obtain a latex composition and film-shaped friction member-shaped test piece and the same procedure was followed to evaluate them. The results are shown in Table 2.

Example 8

Except for using, instead of the latex of a carboxyl group-containing highly saturated nitrile rubber (A-9) obtained in Production Example 9, the latex of a carboxyl group-containing highly saturated nitrile rubber (A-12) obtained in Production Example 10, the same procedure was followed as in Example 5 to obtain a latex composition and film-shaped friction member-shaped test piece and the same procedure was followed to evaluate them. The results are shown in Table 2.

Comparative Example 6

Except for using, instead of the latex of a carboxyl group-containing highly saturated nitrile rubber (A-9) obtained in Production Example 9, the latex of a carboxyl group-containing highly saturated nitrile rubber (A-13) obtained in Production Example 11 and changing the amount of the phenol resin from 100 parts to 230 parts, the same procedure was followed as in Example 5 to obtain a latex composition and film-shaped fiction member-shaped test piece and the same procedure was followed to evaluate it. The results are shown in Table 2.

Comparative Example 7

Except for using, instead of the latex of a carboxyl group-containing highly saturated nitrile rubber (A-9) obtained in Production Example 9, the latex of a carboxyl group-containing highly saturated nitrile rubber (A-14) obtained in Production Example 11, the same procedure was followed as in Example 5 to obtain a latex composition and film-shaped friction member-shaped test piece and the same procedure was followed to evaluate it. The results are shown in Table 2.

Comparative Example 8

Except for using, instead of the latex of a carboxyl group-containing highly saturated nitrile rubber (A-9) obtained in Production Example 9, the latex of a carboxyl group-containing highly saturated nitrile rubber (A-15) obtained in Production Example 12, the same procedure was followed as in Example 5 to obtain a latex composition and film-shaped friction member-shaped test piece and the same procedure was followed to evaluate it. The results are shown in Table 2.

Comparative Example 9

Except for using, instead of the latex of a carboxyl group-containing highly saturated nitrile rubber (A-9) obtained in Production Example 9, the carboxyl group-containing highly saturated nitrile rubber latex (A-16) obtained in Production Example 12, the same procedure was followed as in Example 5 to obtain a latex composition and film-shaped friction member-shaped test piece and the same procedure was followed to evaluate them. The results are shown in Table 2.

TABLE 2

|  |  |  | Examples | | | | Comparative Examples | | | |
|---|---|---|---|---|---|---|---|---|---|---|
|  |  |  | 5 | 6 | 7 | 8 | 6 | 7 | 8 | 9 |
| Type of carboxyl group-containing (highly saturated) nitrile rubber latex | | | (A-9) | (A-10) | (A-11) | (A-12) | (A-13) | (A-14) | (A-15) | (A-16) |
| Characteristics of carboxyl group-containing (highly saturated) nitrile rubber latex | | | | | | | | | | |
| Rubber composition | Acrylonitrile units | (wt %) | 21 | 32 | 40 | 34 | 34 | 41 | 39 | 29 |
|  | Butadiene units (including saturated parts) | (wt %) | 71.9 | 64.7 | 55.8 | 62.0 | 58.2 | 53.8 | 57.4 | 66.4 |
|  | Methacrylic acid units | (wt %) | 7.1 | 3.3 | 4.2 | 4.0 | 7.8 | 5.2 | 3.6 | 4.6 |
| Iodine value | | | 40 | 20 | 50 | 32 | 280 | 290 | 19 | 35 |
| pH | | | 8 | 9 | 9 | 8 | 9 | 10 | 10 | 9 |
| $\Delta d$ ($\Delta d = d90 - d50$) of rubber particles | | | 0.0277 | 0.0251 | 0.0293 | 0.0301 | 0.0255 | 0.0233 | 0.0221 | 0.0234 |
| Potassium content | | (ppm) | 4500 | 5000 | 4020 | 4700 | 1900 | 2000 | 2030 | 2100 |
| Sodium content | | (ppm) | 1900 | 1690 | 2060 | 1850 | 1900 | 1900 | 1720 | 1800 |
| Composition of latex composition | | | | | | | | | | |
| Carboxyl group-containing (highly saturated) nitrile rubber latex*) | | (parts by weight) | 100 | 100 | 100 | 100 | 100 | 100 | 100 | 100 |
| Phenol resin*) | | (parts by weight) | 100 | 250 | 250 | 100 | 230 | 100 | 100 | 230 |
| Evaluation Coefficient of linear expansion | | | | | | | | | | |
| Coefficient of linear expansion (40-100° C.) | | (μm/° C.) | 1.48 | 1.51 | 1.58 | 1.45 | 2.18 | 2.34 | 1.59 | 1.60 |
| Coefficient of linear expansion (150-200° C.) | | (μm/° C.) | 0.30 | 0.29 | 0.59 | 0.17 | 1.53 | 1.32 | 0.27 | 0.30 |
| Heat aging characteristics | | | | | | | | | | |
| Change rate of 20% stress before and after heat aging | | (%) | 17 | 19 | 18 | 19 | 73 | 71 | 32 | 34 |
| Evaluation of dispersion | | | | | | | | | | |
| Dispersion | | | Good | Good | Good | Good | Good | Poor | Poor | Poor | Poor |

*)Amount converted to solid content

As shown in Table 2, when using a latex containing rubber particles comprised of a carboxyl group-containing highly saturated nitrile rubber containing α,β-ethylenically unsaturated nitrile monomer units in a ratio of 10 to 60 wt % and having an iodine value of 120 or less, and having a difference Δd (Δd=d90−d50) of the volume cumulative 90% particle size (d90) and the volume cumulative 50% particle size (d50) of rubber particles of 0.0240 μm or more, and mixing in a phenol resin as a thermosetting resin, the obtained friction member has a small coefficient of linear expansion and change rate of 20% stress before and after heat aging and is excellent in heat resistance, further the latex is excellent in dispersion with respect to the phenol resin, and these are excellent in compatibility, so the obtained friction member can be said to be excellent in heat resistance and friction characteristics (Examples 5 to 8).

On the other hand, if the carboxyl group-containing nitrile rubber contained in the latex is too high in iodine value, the coefficient of linear expansion and the change rate of 20% stress before and after heat aging are large, and the heat resistance is inferior and, further, the compatibility with the phenol resin is inferior (Comparative Examples 6 and 7).

When using a latex with a difference Δd (Δd=d90−d50) of the volume cumulative 90% particle size (d90) and the volume cumulative 50% particle size (d50) of rubber particles of less than 0.0240 μm, the change rate of 20% stress before and after heat aging are large, and the heat resistance is inferior and, further, the compatibility with the phenol resin is inferior (Comparative Examples 8 and 9).

The invention claimed is:

1. A latex for friction member use comprising rubber particles comprised of a carboxyl group-containing highly saturated nitrile rubber containing α,β-ethylenically unsaturated nitrile monomer units in a ratio of 10 to 60 wt % and having an iodine value of 120 or less, wherein a difference Δd (Δd=d90−d50) between a volume cumulative 90% particle size (d90) of the rubber particles and volume cumulative 50% particle size (d50) of the rubber particles which are measured by a light scattering method is 0.0240 μm or more.

2. The latex for friction member use according to claim 1, wherein the carboxyl group-containing highly saturated nitrile rubber contains 10 to 60 wt % of α,β-ethylenically unsaturated nitrile monomer units, 0.1 to 20 wt % of carboxyl group-containing monomer units, and 20 to 90 wt % of conjugated diene monomer units (including hydrogenated ones).

3. The latex for friction member use according to claim 2, wherein the carboxyl group-containing monomer units are α,β-ethylenically unsaturated monocarboxylic acid monomer units.

4. A latex composition for friction member use comprising the latex for friction member use according to claim 1 and a thermosetting resin.

5. The latex composition for friction member use according to claim 4, wherein the thermosetting resin is one or more types selected from an epoxy resin and phenol resin.

6. The latex composition for friction member use according to claim 4, wherein a content of the thermosetting resin is 40 to 500 parts by weight with respect to 100 parts by weight of the carboxyl group-containing highly saturated nitrile rubber.

7. A friction member obtained by adhering the latex composition for friction member use according to claim 5 to a base material.

\* \* \* \* \*